Patented May 1, 1951

2,551,352

UNITED STATES PATENT OFFICE 2,551,352

INTERPOLYMERS OF CASTOR-OIL MALEATE

Pliny O. Tawney, Passaic, N. J., assignor to United States Rubber Company, New York, N. Y., a corporation of New Jersey No Drawing. Application March 18, 1949,
Serial No. 82,297

11 Claims. (Cl. 260—23)

This invention relates to a method of increasing the yield of soluble, convertible polymeric material obtained from the copolymerization of castor-oil maleates with copolymerizable monoolefinic compounds. More particularly, my invention comprises the interpolymerization of a castor-oil maleate and a copolymerizable monoolefinic compound, with trichloroethylene, whereby increased yields of soluble, convertible resins which are new ternary interpolymers are obtained.

Copolymers of castor-oil maleates with monoolefinic compounds, e. g., styrene, are in many respects well adapted to the preparation of coating and laminating compositions which, after application, can be cured to a solvent- and heat-resistant state. In this connection they are particularly suitable for blending with other thermosetting resins, e. g., urea-formaldehyde resins and melamine-formaldehyde resins, to secure more flexible products. However, such resins derived from castor-oil maleates of high acid number, e. g., 50–100, i. e., those containing relatively large amounts of maleic acid ester groups (such as are obtained, for example, from the reaction of 1 mole of castor-oil with 2–3 moles of maleic anhydride in a manner well known to those skilled in the art), tend to form an insoluble gel during the copolymerization reaction and before more than a minor proportion of monomers has been converted to the copolymeric form. Such products are of limited commercial utility since the presence of the masses of insoluble gel effects serious discontinuities in the resulting coating or laminate such as cracks, lumps and blisters. A soluble resin can be obtained, albeit in low yields, by halting the copolymerization prior to gelation, although the large amounts of unreacted monomeric starting materials remaining must be removed, purified and recycled for use in subsequent copolymerization in order to achieve some degree of economic feasibility. The copolymerization of castor-oil maleates of relatively low acid number, e. g., 20–40 (such as can be obtained from the reaction of 0.3–0.6 mole of maleic anhydride with 1 mole of castor-oil), with styrene shows a diminished tendency toward premature gelation but the resulting resins are softer, less mar-resistant and often require more stringent curing conditions to achieve a satisfactory degree of solvent- and heat-resistance in the final product than those derived from the castor-oil maleates of higher acid number.

I have now unexpectedly discovered that when a castor-oil maleate is interpolymerized with both styrene and trichloroethylene, the customary premature gelation of the reaction mixture is averted or postponed to such an extent that markedly improved yields of soluble, convertible resins, which are new ternary interpolymers, are obtained. Moreover, as the amount of the monomeric interpolymerizable trichloroethylene in the initial reaction mixture is increased, the yield of the resulting soluble ternary interpolymers is likewise increased, and in this way, it is now possible to convert the major proportion of both the castor-oil maleate and the styrene to the soluble interpolymeric form without danger of premature gelation.

Although styrene has been cited above as illustrative of the monoolefinic compounds which are suitable for copolymerization with castor-oil maleates in the method of my invention, various substituted styrenes may also be employed, including the alpha- and para-substituted styrenes, e. g., p-chlorostyrenes, p-methylstyrene, alpha,p-dimethylstyrene, p-fluorostyrene, p-trichloromethylstyrene, p-methoxystyrene, and 2,5-dichlorostyrene. The styrenes can be replaced in whole or part by other monoolefinic hydrocarbons, e. g., vinyl naphthalene and aliphatic olefinic hydrocarbons, especially the lower aliphatic olefinic hydrocarbons, i. e., those having 2 to 6 carbon atoms, e. g., ethylene, propylene and isobutylene, although many of the more reactive olefins suffer the economic disadvantage of being gases at room temperature and hence they will require pressurized equipment for the copolymerization reaction.

Other suitable copolymerizable monoolefinic compounds which may be used in place of styrene but which tend to yield softer resins, include vinyl mono-esters of non-enic acids, e. g., vinyl acetate, vinyl butyrate and vinyl benzoate, and mono-vinyl ethers, e. g., vinyl ethyl ether, vinyl propyl ether and vinyl benzyl ether, and the esters of monoolefinic monocarboxylic acids with non-enic alcohols, e. g., methyl acrylate, n-butyl acrylate, tolyl acrylate, methyl methacrylate, ethyl chloroacrylate and methyl crotonate. The monoolefinic acids themselves can be employed although the resulting resins are more sensitive to water and other hydroxylic solvents and to alkali. Besides esters, other hydrolyzable derivatives of such monoolefinic acids can be employed, such as the anhydrides, acid chlorides, nitriles and amides, the two latter yielding resins which are harder but compatible with fewer solvents.

The castor-oil maleates, as is well known to those skilled in the art, are prepared by the esterification of maleic acid or maleic anhydride with castor-oil. Usually about 1 mole of castor-oil is employed per mole of maleic anhydride. This invention also contemplates the employment of castor-oil esters obtained by substitution of some or all of the maleic anhydride by the homologues of maleic acid, such as citraconic acid or citraconic anhydride. If desired, various modifying ingredients, such as linseed oil, may be present in the reaction mixture during the preparation of the ester to be employed in this invention.

In the practice of my invention a castor-oil maleate, preferably one having an acid number of from about 30 to 100, is reacted with a copolymerizable monoolefinic compound, and with trichloroethylene, in molar ratio of 1:0.5:120 to 20:4:120, respectively, and more preferably 1:3:50 to 12:6:50. The reaction is ordinarily carried out at temperatures in the range of 25 to 120° C., particularly in the range 40–100° C. for a time sufficient to form at least an appreciable quantity of the soluble interpolymer. Suitable reaction times will usually be found to be from 4 to 80 hours. Suitable promoters or catalysts for the reaction include conventional sources of free radicals such as organic peroxides, e. g., benzoyl peroxide, acetyl peroxide and tertiary-butyl hydroperoxide, in amounts of from about 0.1 to 10.0% by weight of the total interpolymerizable reactants.

During the reaction, the increasing viscosity of the reaction mixture can be employed as a measure of the extent of the reaction. The resulting soluble interpolymer can be isolated from the reaction mixture by evaporation of any unreacted trichloroethylene or by precipitation of the interpolymer through addition of a non-solvent, e. g., methanol.

The resulting resins can be dissolved in appropriate solvents, e. g., acetone, xylene or mixtures thereof, and employed as coating, impregnating or laminating compositions, either alone or in conjunction with other polymeric materials such as urea-formaldehyde resins. Upon application of heat, these compositions are converted to a solvent- and heat-resistant state.

The following examples disclose my invention in more detail. All parts are by weight.

EXAMPLE 1

Castor-oil maleate is interpolymerized with styrene or vinyl acetate, respectively, together with trichloroethylene, in the presence of benzoyl peroxide until the point of incipient gelation is attained in each case. The reaction mixtures are then diluted with an excess of methanol and the precipitated interpolymers are thoroughly washed with methanol before drying in vacuo to constant weight.

Table I below summarizes the amounts of the castor-oil maleate, monoolefinic compound, trichloroethylene, and benzoyl peroxide, and the resulting soluble interpolymer, as well as the reaction times. To further illustrate the advantages of my invention, examples of the prior art copolymerization in the absence of trichloroethylene are also included (I–a, b, g, i).

Table I

| | Castor-Oil Maleate | | Monoolefinic Compound | Trichloro-Ethylene | Benzoyl Peroxide | Reaction Time, Hrs. | Reaction Temp., °C. | Soluble Interpolymer |
|---|---|---|---|---|---|---|---|---|
| | Parts | Acid No. | | | | | | |
| a | 100 | 54 | Styrene, 121 | | 1.1 | 4.7 | 60 | 15.2 |
| b | 100 | 54 | ----do---- | [1] 186.0 | 2.04 | 6.4 | 60 | 24.2 |
| c | 100 | 54 | ----do---- | 76.5 | 1.46 | 4.75 | 60 | 24.4 |
| d | 100 | 54 | ----do---- | 152.0 | 1.87 | 8.8 | 60 | 38.4 |
| e | 100 | 54 | ----do---- | 305.0 | 2.61 | 12.2 | 60 | 55.0 |
| f | 100 | 54 | ----do---- | 1,470.0 | 8.75 | 71.0 | 60 | 130.0 |
| g | 100 | 71 | Styrene, 115.7 | | 1.07 | 0.8 | 80 | 8.5 |
| h | 100 | 71 | ----do---- | 485.0 | 3.52 | 3.3 | 80 | 69.5 |
| i | 100 | 54 | Vinyl Acetate, 100 | | 1.0 | 9.0 | 60 | 21.7 |
| j | 100 | 54 | ----do---- | 368 | 15.15 | 71.0 | 60 | 80.5 |

[1] Trichloroethylene replaced by an inert solvent, benzene.

Comparison of I–a with I–c above shows that the presence of even relatively small amounts of the interpolymerizable trichloroethylene in the interpolymerization of castor-oil maleates with monoolefinic compounds effects a very significant increase in the yield of soluble interpolymeric product. Succeeding examples indicate further increases in the yield of soluble interpolymer which are obtained when larger amounts of the trichloroethylene or employed.

EXAMPLE 2

A mixture of 54 parts of castor-oil maleate (acid number, 71), 52 parts of styrene and 263 parts of trichloroethylene is heated at 80° C. for 2 hours in the presence of 1.16 parts of benzoyl peroxide, to yield 47.9 parts of soluble interpolymer which can be converted to a solvent- and heat-resistant state by heating at elevated temperatures, e. g., 120–200° C.

Five and six hundredths parts of a 34.6% solution of the above soluble interpolymer in xylene is admixed with 1.37 parts of a 54.8% solution of a commercial urea-formaldehyde solution in xylene. The mixture is thinned to a pourable viscosity by the addition of xylene and is then poured onto a glass plate. After heating at 150° C. for 30 minutes a clear, tough insoluble film is obtained.

EXAMPLE 3

A mixture of 27 parts of castor-oil maleate (acid number, 71), 31 parts of styrene, 213 parts of trichloroethylene and 1.3 parts of benzoyl peroxide is heated at 80° C. for 6.1 hours with stirring, and in an atmosphere of carbon dioxide.

The reaction mixture is then evacuated at 40° C. and the residual resin is diluted with about 100% by weight of xylene. This solution is mixed with a 50% solution of urea-formaldehyde resin in xylene in such a way that a 70:30 blend (by weight) of my interpolymer and the urea resin in obtained. The solution is then thinned to a desirable viscosity by a 1:1 xylene-butanol mixture and poured onto a panel. After baking for 30 minutes at 150° C. a hard, tough, colorless, insoluble film is obtained.

Having thus described my invention, what I claim and desire to protect by Letters Patent is:

1. A method which comprises heating a mixture of (a) 120 moles of trichloroethylene, (b) 1 to 20 moles of an ester of castor-oil with an unsaturated dibasic organic acid selected from the group consisting of maleic acid and its homologues and (c) 0.5 to 4 moles of another copolymerizable monoolefinic compound at a temperature sufficient to effect copolymerization of the said ingredients, in the presence of an organic peroxidic polymerization catalyst in amount effective to cause copolymerization of said ingredients, whereby a fusible, convertible interpolymer of the said ingredients is formed.

2. A method which comprises heating a mixture of 120 moles of trichloroethylene, 1 to 20 moles of an ester of caster-oil with an unsaturated dibasic organic acid selected from the group consisting of maleic acid and its homologues, and 0.5 to 4 moles of another copolymerizable monoolefinic compound at a temperature of 25° to 120° C. in the presence of an organic peroxidic polymerization catalyst in amount of from 0.1 to 10.0% by weight of the aforesaid reactants, whereby a soluble, convertible interpolymer of the said reactants is formed.

3. A method which comprises heating a mixture of 50 moles of trichloroethylene, 1 to 12 moles of a castor-oil maleate having an acid number of 30 to 100, and 3 to 6 moles of another copolymerizable monomer at a temperature of 40° to 100° C. in the presence of an organic peroxidic polymerization catalyst in amount of from 0.1 to 10.0% by weight of the aforesaid reactants, whereby a soluble, convertible interpolymer of said reactants is formed.

4. A method as in claim 3 in which the additional copolymerizable monoolefinic compound is styrene.

5. A method as in claim 3 in which the additional copolymerizable monoolefinic compound is vinyl acetate.

6. A method as in claim 3 in which the additional copolymerizable monoolefinic compound is a lower aliphatic monoolefinic hydrocarbon having from 2 to 6 carbon atoms.

7. An interpolymer of trichloroethylene, an ester of castor-oil and an unsaturated dibasic organic acid selected from the group consisting of maleic acid and its homologues, and another copolymerizable monoolefinic compound.

8. An interpolymer of trichloroethylene, a castor-oil maleate, and another copolymerizable monoolefinic compound.

9. An interpolymer as in claim 8, in which the copolymerizable monoolefinic compound is styrene.

10. An interpolymer as in claim 8, in which the copolymerizable monoolefinic compound is vinyl acetate.

11. An interpolymer as in claim 8, in which the copolymerizable monoolefinic compound is a lower aliphatic monoolefinic hydrocarbon having from 2 to 6 carbon atoms.

PLINY O. TAWNEY.

REFERENCES CITED

The following references are of record in the file of this patent:

UNITED STATES PATENTS

| Number | Name | Date |
| --- | --- | --- |
| 1,976,224 | Herrmann et al. | Oct. 9, 1934 |
| 2,439,953 | Swiss et al. | Apr. 20, 1948 |